US007869994B2

(12) United States Patent
Nongpiur et al.

(10) Patent No.: US 7,869,994 B2
(45) Date of Patent: Jan. 11, 2011

(54) TRANSIENT NOISE REMOVAL SYSTEM USING WAVELETS

(75) Inventors: Rajeev Nongpiur, Vancouver (CA); Shreyas A. Paranjpe, Vancouver (CA); Phillip A. Hetherington, Port Moody (CA)

(73) Assignee: QNX Software Systems Co., Ottawa, Ontario (CA)

( * ) Notice: Subject to any disclaimer, the term of this patent is extended or adjusted under 35 U.S.C. 154(b) by 1008 days.

(21) Appl. No.: 11/699,709

(22) Filed: Jan. 30, 2007

(65) Prior Publication Data

US 2008/0183466 A1 Jul. 31, 2008

(51) Int. Cl.
*G10L 21/02* (2006.01)
*G10L 19/02* (2006.01)
*H04B 15/00* (2006.01)

(52) U.S. Cl. ...................... 704/226; 381/94.1; 704/203; 704/204

(58) Field of Classification Search ....................... None
See application file for complete search history.

(56) References Cited

U.S. PATENT DOCUMENTS 6,763,339 B2 * 7/2004 Fu et al. ....................... 706/22
7,054,454 B2 * 5/2006 Causevic et al. ........... 381/94.1
2004/0044531 A1 * 3/2004 Kasabov et al. ............. 704/256

OTHER PUBLICATIONS

Hu, Y. et al. "Speech enhancement based on wavelet thresholding the multitaper spectrum," IEEE Transactions on Speech and Audio Processing, vol. 12, No. 1, Jan. 2004.*

Donoho, D. "De-noising by Soft-Thresholding," IEEE Transactions on Information Theory, vol. 41; No. 3, May 1995.*

Bahoura, M. et al. "Wavelet speech enhancement based on time-scale adaptation" Speech Communication, pp. 1620-1637 (2006).*

Wang, Z. et al. "Combined discrete wavelet transform and wavelet packet decomposition for speech enhancement," ICSP Proceedings, 2006.*

R. R. Coifman and M. V. Wickerhauser, "Entropy-Based Algorithms for Best Basis Selection", IEEE Transactions on Information Theory, vol. 38, No. 2, Mar. 1992, 6 pgs.

A. H. Tewfik, D. Sinha, and P. Jorgensen, "On the Optimal Choice of a Wavelet for Signal Representation", IEEE Transactions on Information Theory, vol. 38, No. 2, Mar. 1992, 19 pgs.

R. A. Gopinath, J. E. Odegard, and C. S. Burrus, "Optimal Wavelet Representation of Signals and the Wavelet Sampling Theorem", IEEE Transactions on Circuits and Systems—II: Analog and Digital Signal Processing, Val 41, No. 4, Apr. 1994, 16 pgs.

(Continued)

*Primary Examiner*—Matthew J Sked
(74) *Attorney, Agent, or Firm*—Brinks Hofer Gilson & Lione

(57) ABSTRACT

A transient noise removal system removes or dampens undesired transients from speech. When the transient noise removal system receives a speech frame, the system performs a wavelet transform analysis. The speech frame may be represented by one or more wavelet coefficients across one or more wavelet levels. For a given wavelet level, the transient noise-removal system may determine a wavelet threshold. The transient noise removal system may compare the threshold corresponding to a wavelet level to the wavelet coefficients within that level. The transient noise removal system may attenuate each wavelet coefficient based on a comparison to a threshold.

34 Claims, 11 Drawing Sheets

OTHER PUBLICATIONS

H. K. Krim, D. Tucker, S. Mallat, and D. Donoho, "On Denoising and Best Signal Representation", IEEE Transactions on Information Theory, vol. 45, No. 7, Nov. 1999, 14 pgs.

J. O. Chapa and R. M. Rao, "Algorithms for Designing Wavelets to Match a Specified Signal", *IEEE Transactions on Signal Processing*, vol. 48, No. 12, Dec. 2000, 12 pgs.

* cited by examiner

TRANSIENT NOISE REMOVAL SYSTEM USING WAVELETS

BACKGROUND OF THE INVENTION

1. Technical Field

The invention relates to speech signal processing, and in particular, to removing transients from a speech signal.

2. Related Art

Signal processing systems often operate in noisy environments. A voice command or communication system in an automobile may operate in an environment that includes noise from rain, wind, road sounds, or from other sources. Such noise may result in masking, distortion, or the corruption of signals, and other detrimental effects on speech signals.

Some attempts to remove transient noise from speech have used a Fourier transform analysis. The Fourier transform analysis may identify the frequency, but not the position of transient noise within a data frame. Resolution may be improved by reducing the frame size of a sample. In doing so, however, frequency resolution may decline. Therefore, a need exists for an improved system that removes transient noise from speech.

SUMMARY

A transient noise removal system removes undesired transients from speech. The system may receive a speech frame and perform a wavelet transform analysis on the speech frame. The speech frame may be represented by one or more wavelet coefficients across one or more wavelet levels. For a given level, the system may determine a wavelet threshold. The system may compare the threshold for that level to the wavelet coefficients within that level. The system may attenuate each wavelet coefficient that is greater than or equal to the threshold.

A threshold level may be calculated through the product of a wavelet constant and the median of wavelet coefficients within that level. The system may establish multiple thresholds for a given level. The system may establish a sliding window within the wavelet level. The threshold may be the product of the wavelet constant and the median of wavelet coefficients within the sliding window. The system may attenuate wavelet coefficients within that sliding window that are greater than or equal to the corresponding threshold.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
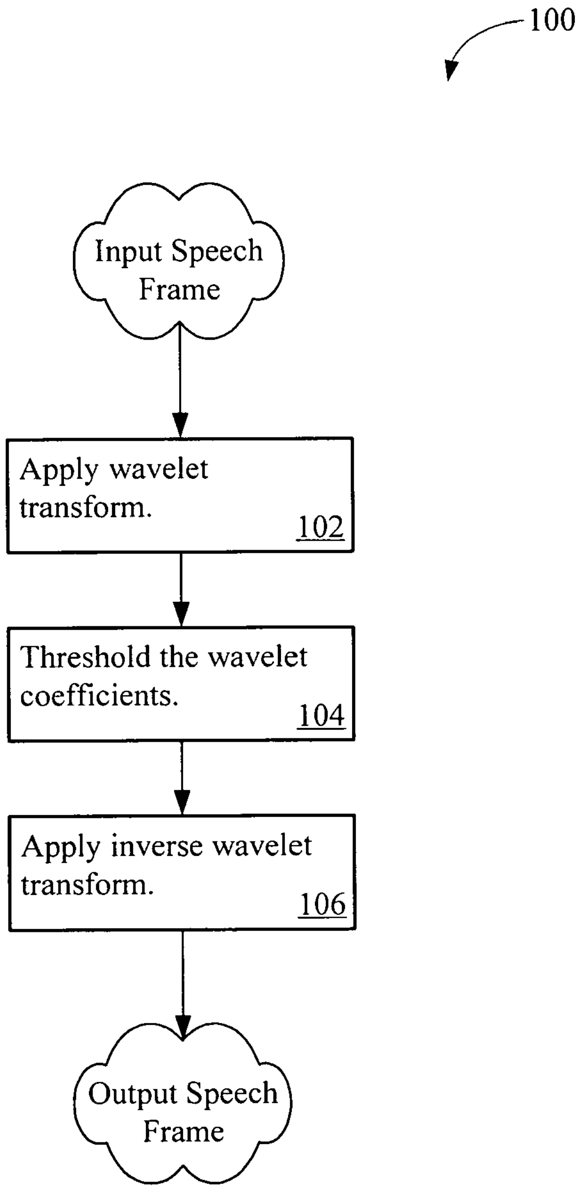
FIG. 1 is a process by which a transient noise removal system may remove transient noise from an input speech frame.

FIG. 1 is a process 100 by which a transient noise removal system may remove transient noise from an input speech frame. The input speech frame may be one of a set of data frames extracted from an input speech signal. The input speech signal may be received from a speech detection device, such as a microphone or other device that converts audio sounds into electrical energy. The input speech signal may include speech components and/or transient noise components.

The transient noise removal system applies a wavelet transform to the input speech frame (Act 102). The wavelet transform provides a multi-resolution analysis of the input speech frame, including increased time resolution for higher frequency components and increased frequency resolution for lower frequency components. The wavelet transform may use a series of cascading high-pass and low-pass filters to decompose the input speech frame into one or more wavelet coefficients across one or more different wavelet levels.

The number of wavelet levels may depend on the length L of the input speech frame, where the number of wavelet levels may equal $\log_2 L$. For example, in one system where the frame length is 256 samples (i.e., $2^8$), the number of levels would be $\log_2(256)=8$. The number of wavelet coefficients in each level may equal $2^x$, where x is the level number. In the above example, level 0 will have $2^0=1$ wavelet coefficient while level 7 will have $2^7=128$ wavelet coefficients.

Figure 2:
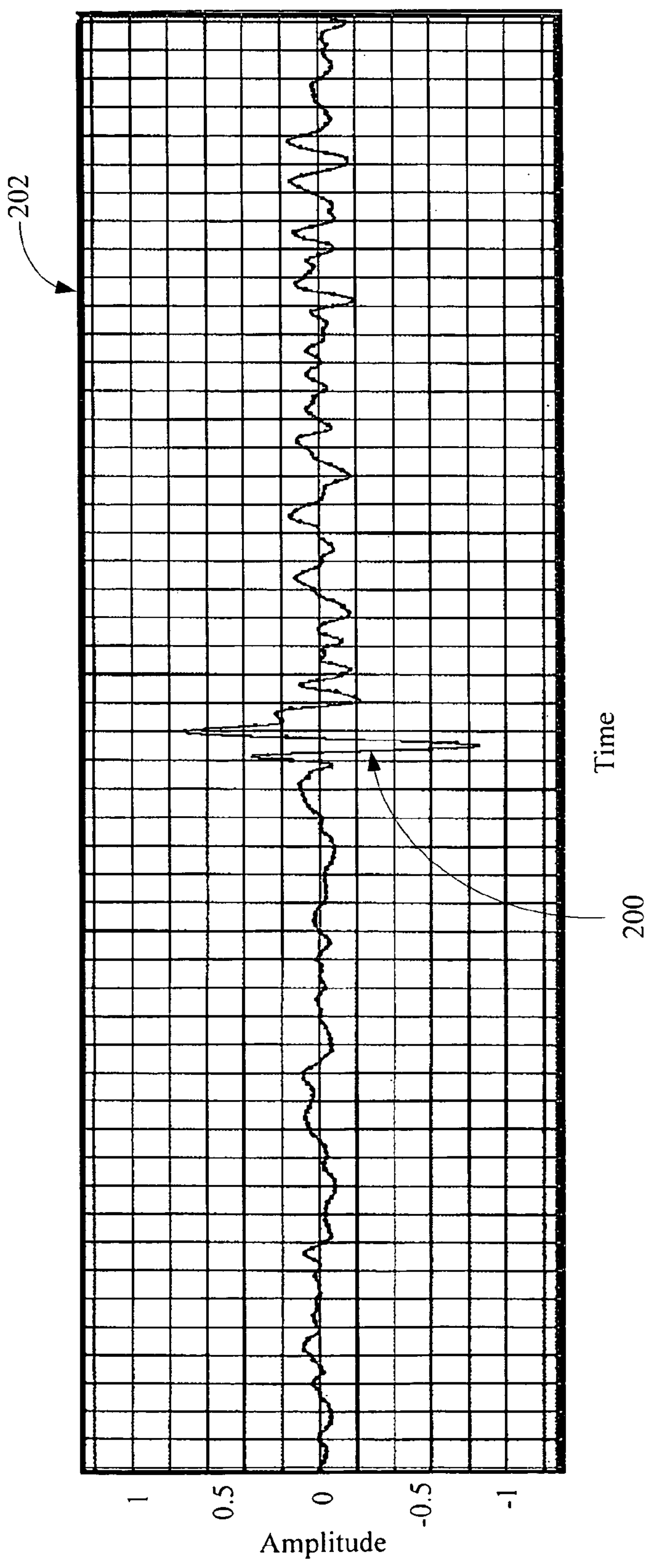
FIG. 2 shows the relationship between amplitude and time of an exemplary rain transient within a frame.
Figure 3:
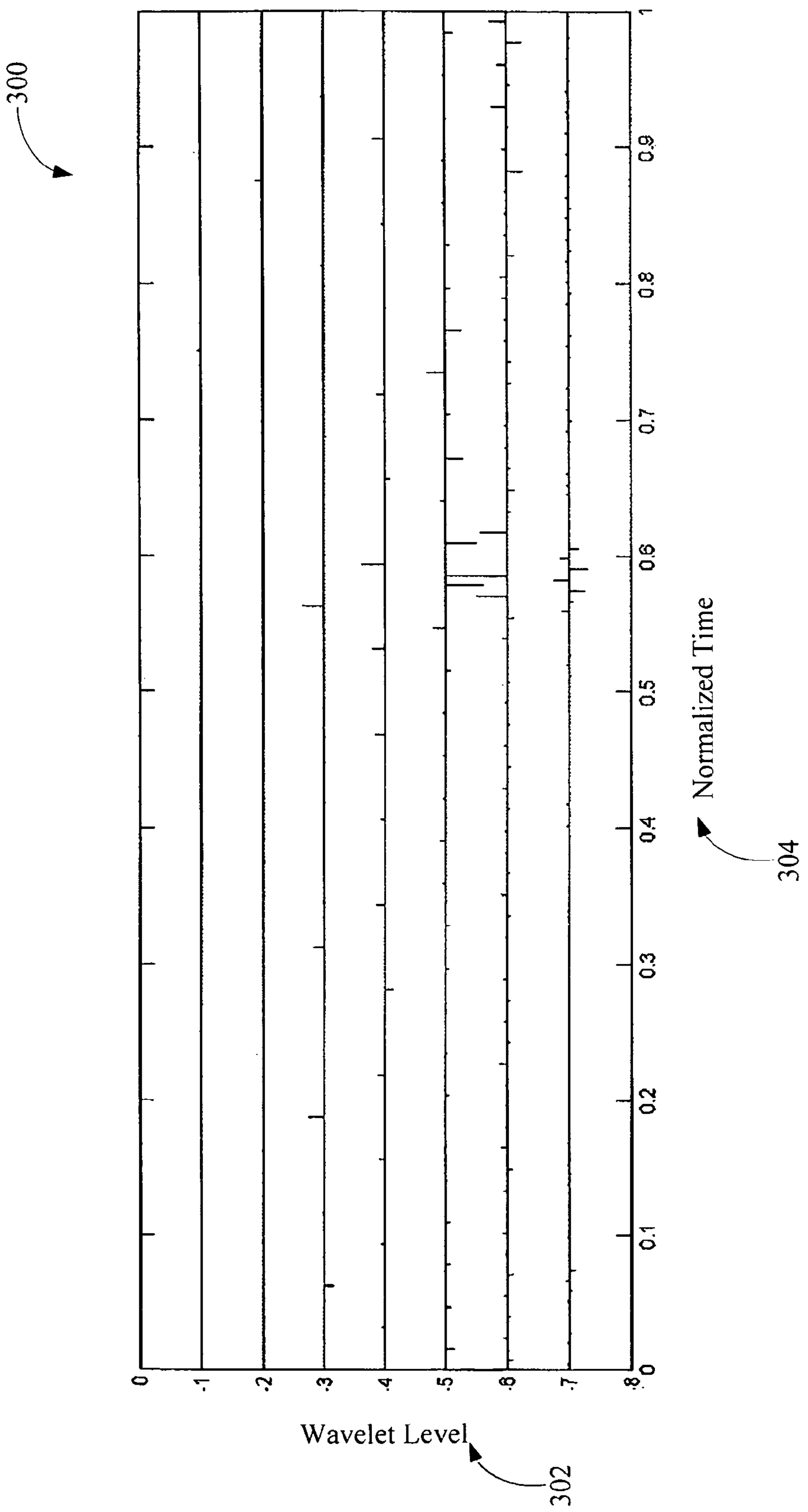
FIG. 3 is a graph showing the frame of FIG. 2 represented by multiple wavelet coefficients across multiple wavelet levels or scales.

FIG. 2 shows the relationship between amplitude and time of an exemplary rain transient 200 within a frame 202 of length 256 at a sample rate of about 11 kHz. FIG. 3 is a graph 300 showing the frame 202 represented by multiple wavelet coefficients across multiple wavelet levels or scales 302. The x-axis of the graph 300 relates to a normalized time index 304 of the frame 202 of FIG. 2. Each vertical extension from the horizontal axes of FIG. 3 represents a wavelet coefficient. The y-axis corresponds to different wavelet levels or scales 302.

The wavelet levels correspond to different frequency bands that are spanned by the input speech frame. The lower levels, such as wavelet level 0, may correspond to the lower frequency bands, and the higher levels, such as wavelet level 7, may correspond to the higher frequency bands. As shown in the FIG. 3, the number of wavelet coefficients in each level may progressively decrease by a factor of two from level 7 down through level 0.

The transient noise removal system may obtain the wavelet coefficients corresponding to the different levels by passing the input speech frame through a series of cascading high-pass and low-pass filters. In some systems, the high-pass and low-pass filters may be half-band filters. Each set of high-pass and low-pass filters may correspond to a wavelet level. The outputs of each filter may be downsampled by a predetermined order, such as by an order of 2.

In the example of an input speech frame of length 256, the highest wavelet level, level 7, may have 128 samples after the input speech frame is passed through a first set of high-pass and low-pass filters and downsampled by an order of 2. The output of the high-pass filter may represent the 128 wavelet coefficients for level 7. The output of the low-pass filter may be passed through a second set of high-pass and low-pass filters and downsampled. The output of the second high-pass filter may represent the 64 wavelet coefficients of level 6. The output of the second low-pass filter may be passed through a third set of high-pass and low-pass filters.

The transient noise removal system may continue to pass the input speech frame through sets of high-pass and low-pass filters until it reaches level 0, or until another desired level is reached. Through each pass of the high-pass and low-pass filters, the frequency resolution may increase. In this process, the wavelet transform may provide a multi-resolution analysis of the input speech frame, with higher time resolution at higher wavelet levels (corresponding to higher frequencies), and higher frequency resolution at lower wavelet levels (corresponding to lower frequencies). For example, level 7 may provide approximately eight times the time resolution of the level 4 (i.e., 128 samples versus 16 samples), while level 4 may provide approximately eight times the frequency resolution of level 7 (i.e., spanning approximately an eighth of the frequency range spanned by level 7).

The transient noise removal system may apply a threshold to the wavelet coefficients to determine which coefficients correspond to a transient noise component of the input speech frame (Act 104). The transient noise removal system may calculate a different threshold for each level. When the transient noise removal system determines that a wavelet coefficient corresponds to transient noise, the system may adjust the wavelet coefficient to reduce or eliminate the transient noise.

After adjusting any wavelet coefficients that correspond to transient noise, the transient noise removal system may apply an inverse wavelet transform to reconstruct the input speech frame in the time domain as an output speech frame (Act 106). Having attenuated the wavelet coefficients corresponding to transient noise within the input speech frame, the transient noise components of the original input speech signal may be substantially eliminated or significantly reduced within the output speech frame. The process may be repeated for one or more frames of speech that make up the input speech signal.

The type of wavelet used by the transient noise removal system may be tailored to the type of transient to be removed or dampened. The transient noise removal system may empirically select or design wavelets that are temporally and spectrally similar to the type of transient to be removed or dampened. For example, the transient to be removed or dampened may be approximated by a combination of scaled and/or compressed wavelet values.

Figure 4:
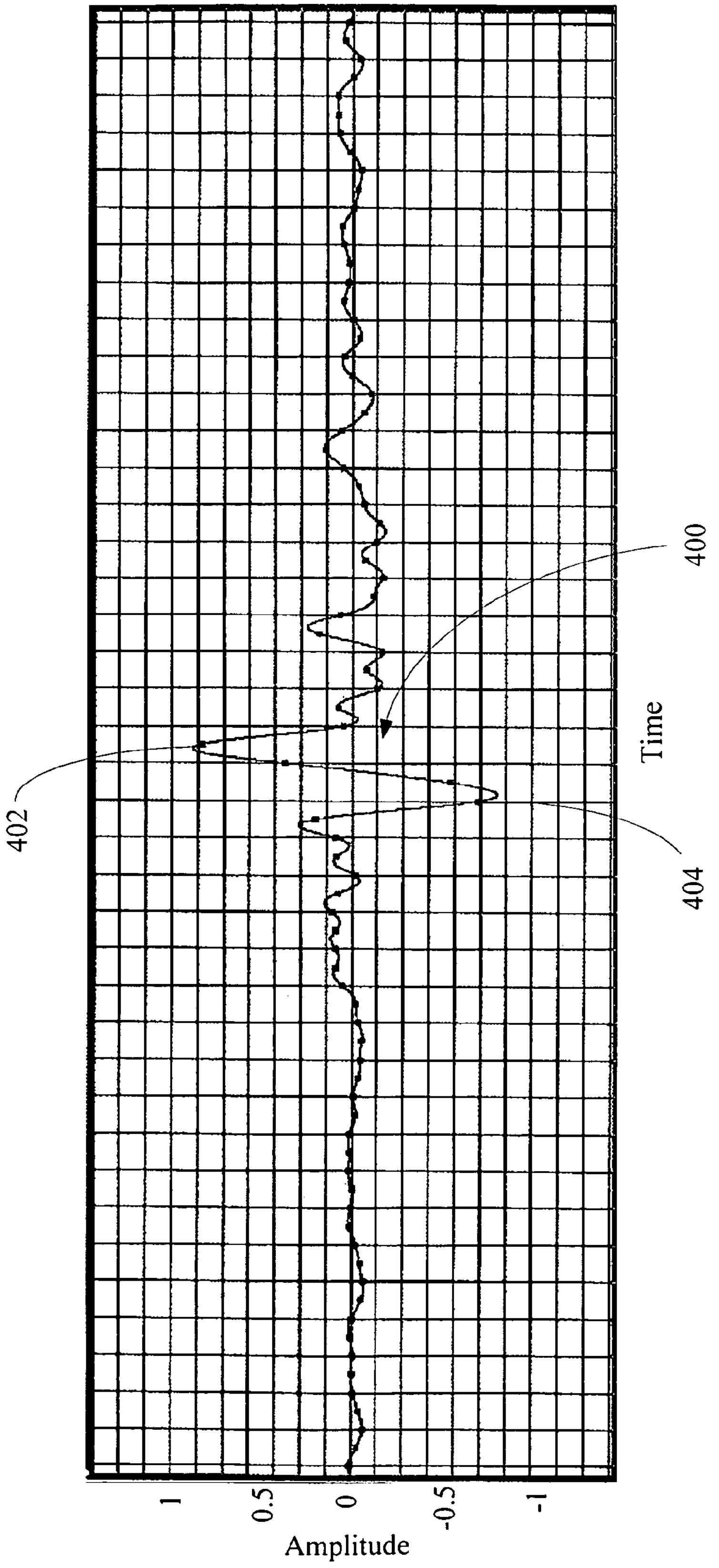
FIG. 4 shows the relationship between amplitude and time of an exemplary rain transient.
Figure 5:
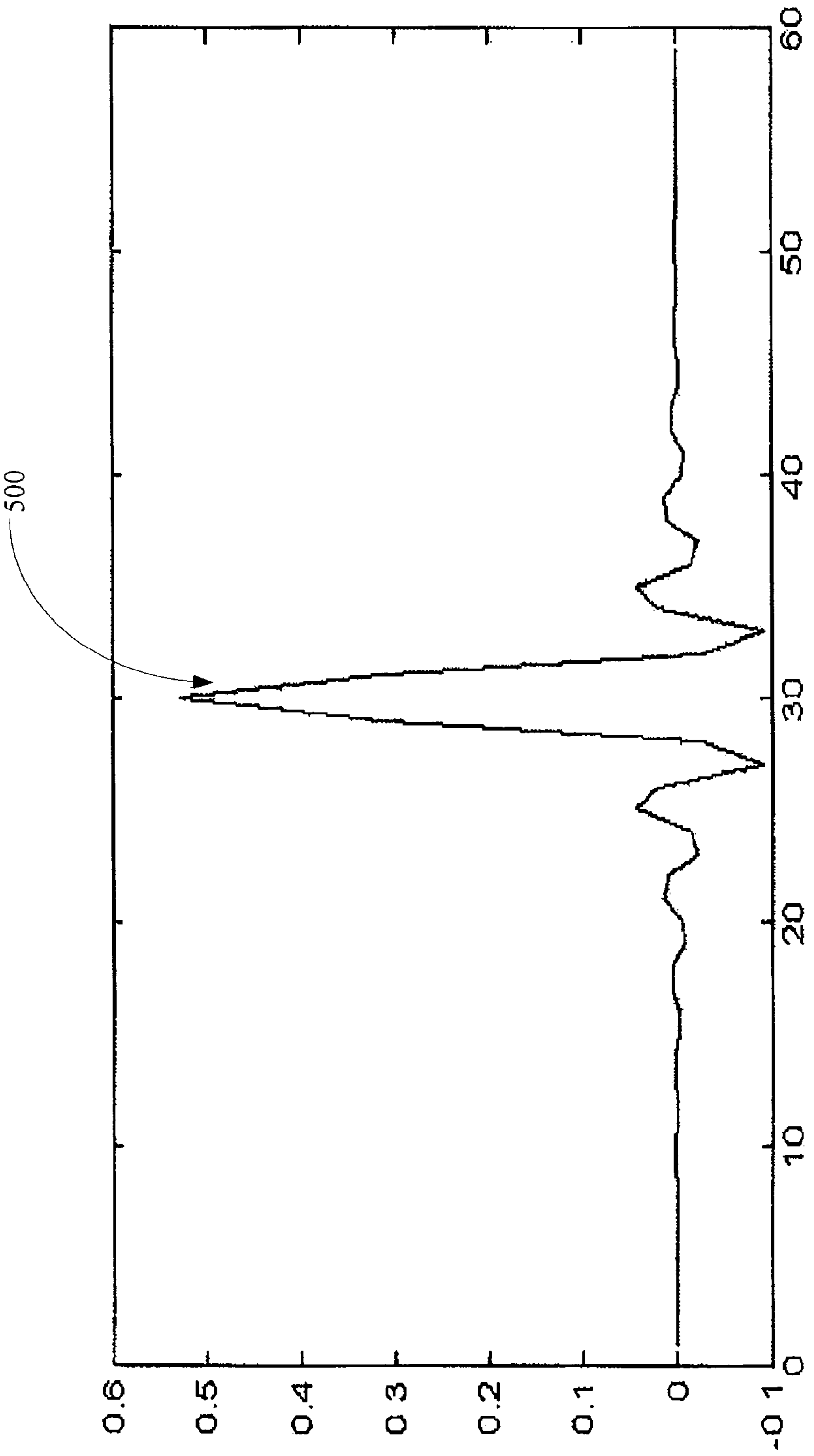
FIG. 5 shows a Battle-Lemarie wavelet.

FIG. 4 shows the relationship between amplitude and time of rain transient 400. The rain transient 400 includes a "peak" and a "valley" portion 402 and 404. FIG. 5 is a Battle-Lemarie wavelet 500. A positively scaled Battle-Lemarie wavelet 500 may approximate the peak portion 402 of the rain transient 400, while a negatively scaled Battle-Lemarie wavelet 500 may approximate the valley portion of rain transient 400. A linear combination of these scaled values of the Battle-Lemarie wavelet 500 may approximate the rain transient 400.

Figure 6:
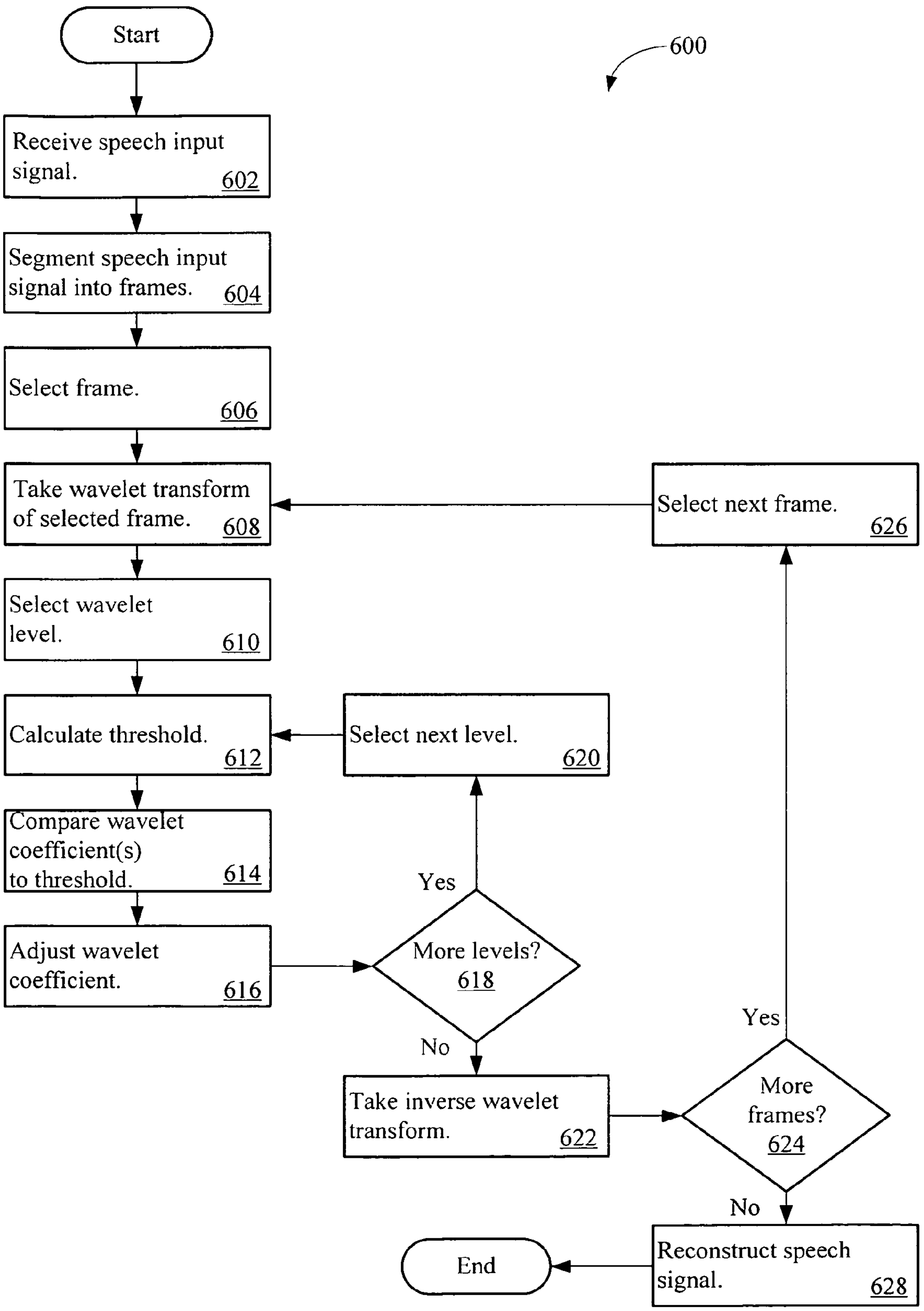
FIG. 6 is a process by which a transient noise may be removed from an input speech signal.

FIG. 6 is a process 600 by which transient noise may be removed, substantially removed, or dampened from an input speech signal. The process receives an input speech signal (Act 602). The input speech signal may be received through a speech detection device, such as a microphone or other device that converts audio sounds into electrical energy. The speech detection device may be coupled to a vehicle operatively linked to a voice recognition system.

The process 600 segments the input speech signal into input speech frames of length L (Act 604). The process 600 may select a first input speech frame for processing (Act 606). The process 600 performs a wavelet transform to decompose the input speech frame (Act 608). The decomposed input speech frame may be represented by wavelet coefficients across wavelet levels. The number of wavelet levels may equal $\log_2 L$ in some processes. The number of wavelet coefficients in each level may equal $2^x$, where x is the wavelet level number.

The process 600 may select a wavelet level to analyze (Act 610). The process 600 may remove transient noise from speech without analyzing each wavelet level. For example, certain types of transients may be expected to show up primarily in the higher frequency regions. In this example, the process 600 may skip some of the levels that correspond to lower frequency bands. The levels identified for analysis by the process 600 may be tailored to the type of transient to be removed, substantially removed, or dampened.

The process 600 may calculate the threshold for the selected level (Act 612). The threshold t for a given level l may be determined according to the following equation:

$$t_l = c_l m_l,$$

where $c_l$ is a wavelet constant and $m_l$ is the median of the absolute values of the level-l wavelet coefficients, $w_l(1)$, $w_l(2), \ldots, w_l(n)$. The median may be given by the following equation:

$$m_l = \text{median}(|w_l(1)|, |w_l(2)|, \ldots, |w_l(n)|),$$

where n is the number of wavelet coefficients within level l.

The wavelet constant $c_l$ may be an empirically adjusted constant based on experimentation. For example, the wavelet constant may be determined based on a consideration of the type of transient to be removed (substantially removed or dampened), the type of wavelet used, the frame length, the wavelet level, or other characteristics of the speech signal or wavelet transform.

The process 600 may use the same wavelet constant to calculate the threshold for each level. Alternatively, the process 600 may use a different wavelet constant for each level. The process 600 may also select the wavelet constant from a set of wavelet constants selected based on various criteria. For example, where the process 600 is programmed to detect and minimize rain transients, the process 600 may include a rain classifying process to detect whether the rain is heavy rain or light rain. In this example, the process 600 may use a different constant for different levels of intensity. The constant may also vary with the types of rain (e.g., persistent and heavy, persistent and light, intermittent and light, etc). As another example, the process 600 may use a different constant for different types of speech components detected within a speech signal.

The process 600 may compare the threshold for level l to the wavelet coefficients within that level (Act 614). Where a wavelet coefficient is greater than, equal to or substantially equal to the threshold, the process 600 may identify the coefficient as corresponding to a transient noise component of the input speech frame. If identified as a transient noise component of the input speech frame, the process 600 may adjust the wavelet coefficient to attenuate the transient noise component of the input speech frame (Act 616).

The process 600 may use a variety of functions to adjust the wavelet coefficient identified as a transient. Some examples of functions the process 600 may use to minimize a wavelet coefficient are discussed in more detail below and shown in FIGS. 7 and 8.

Where the wavelet coefficients for a given level have been compared to the threshold for that level and adjusted to attenuate transient noise, the process 600 may determine if there are more wavelet levels identified for analysis (Act 618). The process 600 may analyze less than all of the wavelet levels available. Where there are more wavelet levels identified for analysis, the process 600 selects a next wavelet level (Act 620). The process 600 repeats Acts 612-618 for the next level to adjust any wavelet coefficients within the next level that are determined to correspond to transient noise.

Where no more levels are identified for analysis, the process 600 performs an inverse wavelet transform to reconstruct the input speech frame (Act 622). The type of wavelet used may be customized to the transient to be removed, substantially removed, dampened, or some other criteria.

The process 600 may determine if there are more frames of the input speech signal to be analyzed (Act 624). When more frames are to be analyzed, the process 600 selects a next frame for analysis (Act 626). The process 600 repeats Acts 608-624 for the next frame to further dampen or substantially attenuate any transient noise detected within the next frame. When there are no more frames of an input speech signal to be analyzed, the process 600 may recombine the frames to reconstruct the speech signal (Act 628). The resulting speech signal may represent a clearer signal with reduced transient noise distortions.

Figure 7:
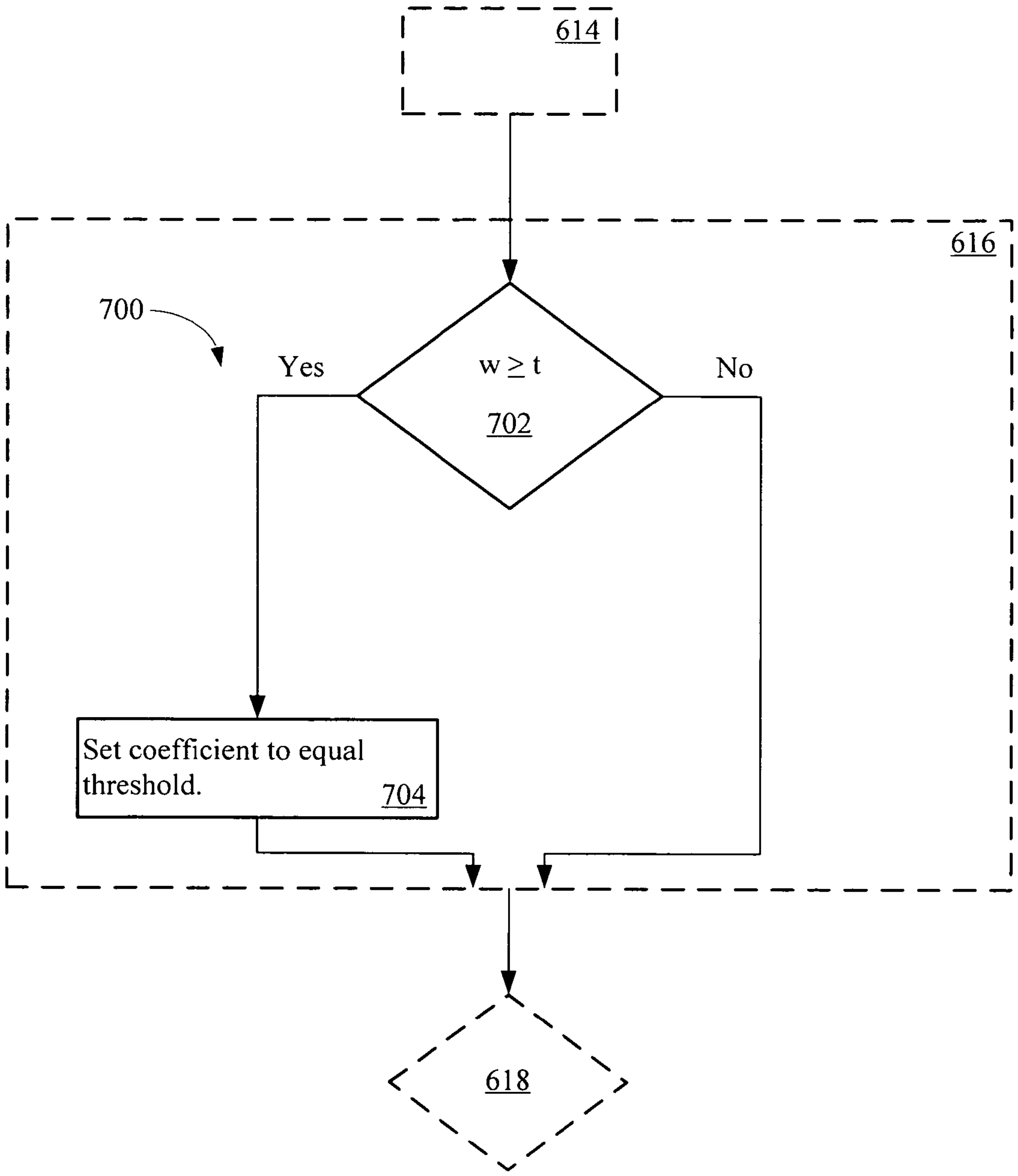
FIG. 7 is a process that may be used to adjust a wavelet coefficient.

FIG. 7 is a process 700 that the may be used to adjust a wavelet coefficient (Act 616 in FIG. 6). After comparing the wavelet coefficient to the threshold (Act 614), the process 700 may determine whether the wavelet coefficient is greater than, equal to, or substantially equal to the threshold (Act 702).

When the wavelet coefficient is greater than, equal to, or substantially equal to the threshold value, the process 700 adjusts the coefficient to equal the threshold value (Act 704) according to the following threshold function $f_T(w)$:

$$
\begin{aligned}
f_T(w) &= w \text{ if } w < t \\
&= t \text{ if } w \geq t,
\end{aligned}
$$

where t is the threshold value and w is the wavelet coefficient value. Where the wavelet coefficient is less than the threshold value, the process 700 determines that no coefficient adjustment is required and may proceed to the next step in the transient noise removal process (Act 618 in FIG. 6).

Figure 8:
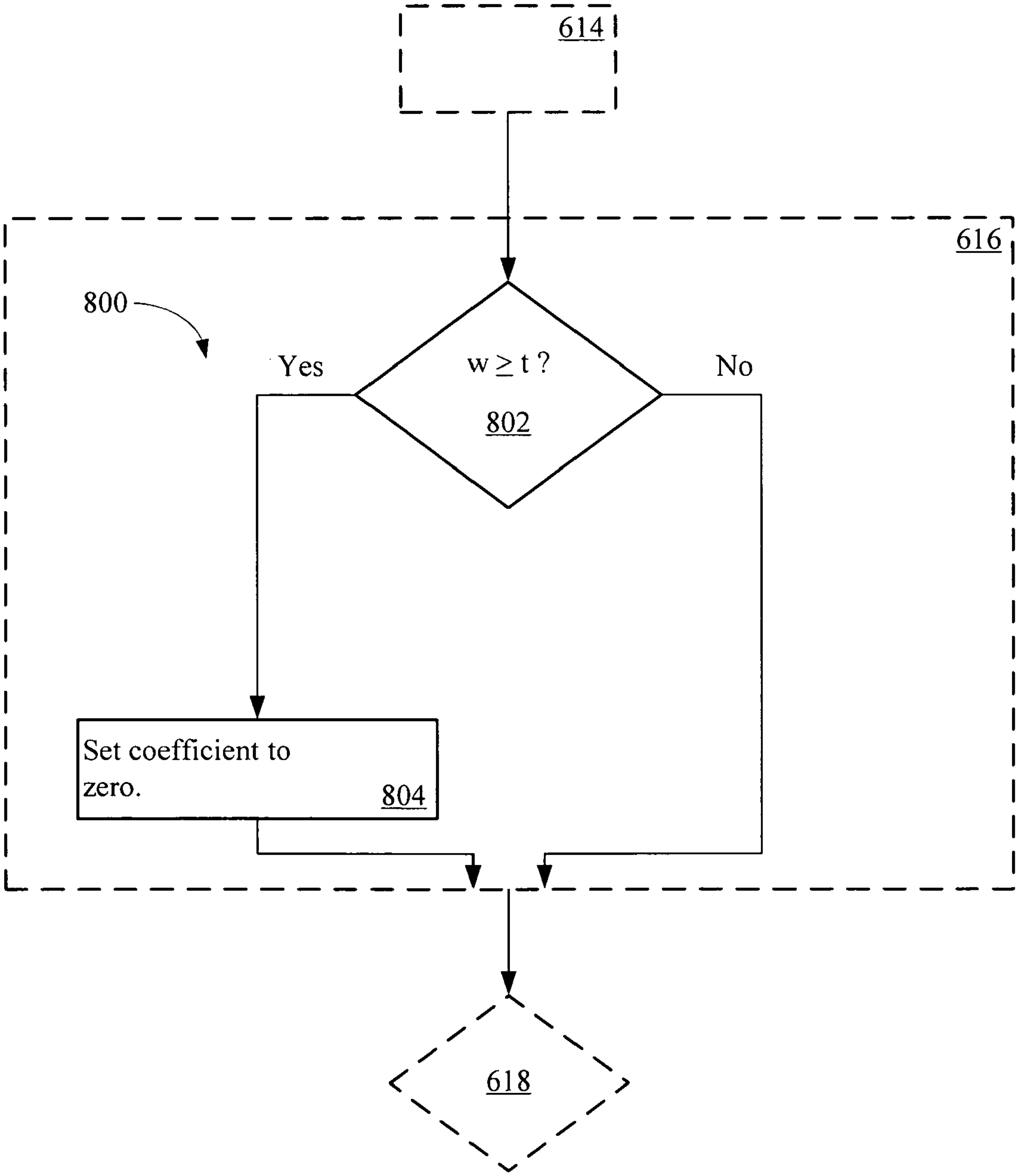
FIG. 8 is another process that may be used to adjust a wavelet coefficient.

FIG. 8 is another process 800 that may be used to adjust a wavelet coefficient (Act 616 in FIG. 6). The process 800 may determine whether the wavelet coefficient is greater than, equal to, or substantially equal to the threshold (Act 800).

When the wavelet coefficients is greater than, equal to, or substantially equal to a threshold value t, the process 800 may re-set the coefficient to equal zero or nearly zero (Act 802). The threshold function $g_T(w)$ may be used:

$$
\begin{aligned}
g_T(w) &= w \text{ if } w < t \\
&= 0 \text{ if } w \geq t.
\end{aligned}
$$

Otherwise, the process 800 determines that no coefficient adjustment is required and may proceed to the next step in the transient noise removal process (Act 618 in FIG. 6). The process 800 may also use other adjustment processes or thresholding functions, besides those described, to adjust a wavelet coefficient. For example, the process 800 may use a threshold function that adjusts the coefficient to some value between zero, or nearly zero, and t, such as t/2. A variable threshold function that variably adjusts the wavelet coefficient based on the amount the wavelet coefficient exceeds the threshold may also be used.

Figure 9:
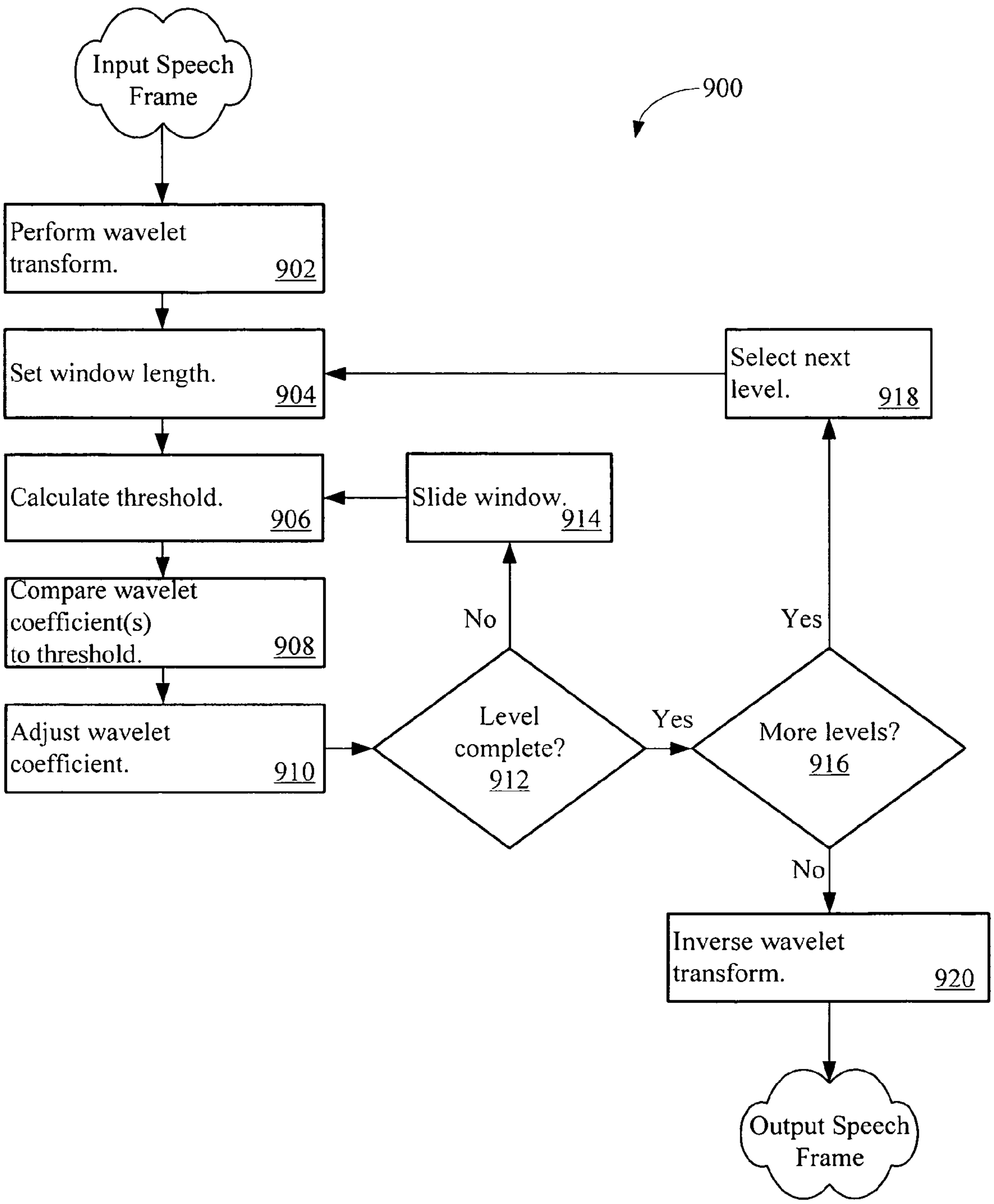
FIG. 9 is a process that may remove transient noise from speech using a sliding window.

FIG. 9 is a process 900 that may remove transient noise from speech using a sliding window. An input speech frame may include speech components and transient noise components. At some wavelet levels, the magnitude of the wavelet coefficients corresponding to speech may resemble the magnitudes of the wavelet coefficients corresponding to transient noise. The process 900 may use a sliding window thresholding technique to attenuate the transient noise components while protecting any speech components from undesired attenuation.

The process 900 receives an input speech frame. The process 900 may perform a wavelet transform to decompose the input speech frame into wavelet coefficients across wavelet levels (Act 902). The process 900 may set a window length $n_l$ (Act 904). The window length for each level may be the same or may also vary across and/or within different levels.

The process 900 may determine a starting position for the window and calculate a threshold for the window (Act 906). The threshold may be a product of an empirically chosen wavelet constant and the median of wavelet coefficients within the window.

The process 900 compares the threshold for the window to the wavelet coefficients within the window (Act 908). Where a wavelet coefficient within the window is greater than, equal to, or substantially equal to the threshold, the process 900 identifies the coefficient as corresponding to transient noise and adjusts the wavelet coefficient (Act 910).

The process 900 may protect the speech component of a signal from undesired attenuation. At some levels, wavelet coefficients corresponding to both speech and transient noise may be large. However, the wavelet coefficients corresponding to speech may be adjacent to other coefficients of similar magnitude, while the wavelet coefficients corresponding to transient noise are often more solitary and adjacent to coefficients of smaller magnitudes.

When a sliding window includes wavelet coefficients corresponding to speech, the median, and thus the threshold, will be high. When the sliding window reaches a position that includes wavelet coefficients corresponding to transient noise, the median, and thus the threshold, will be lower. Therefore, the process 900 may apply a higher threshold to wavelet coefficients that are more likely to correspond to speech, while applying a lower threshold to wavelet coefficients that are more likely to correspond to transient noise. As a result, any speech components of an input speech frame may be protected while effectively attenuating any transient noise components.

The process 900 determines if the analysis of the current level is complete (Act 912). When more analysis of a level is to be done, the process 900 may slide the window to a new location within the level (Act 914) and repeat Acts 906-912 for the new window location.

When analysis of the current level is complete, the process 900 determines if there are more levels to be analyzed (Act 916). If there are more levels to be analyzed, the process 900 selects a next level (Act 918). The process 900 may repeat Acts 904-916 for the next level. If there are no more levels identified for analysis, the process 900 performs an inverse wavelet transform to reconstruct the input speech frame (Act 920). The reconstructed output speech frame may include any speech components of the original frame with the transient noise components dampened or substantially attenuated.

Figure 10:
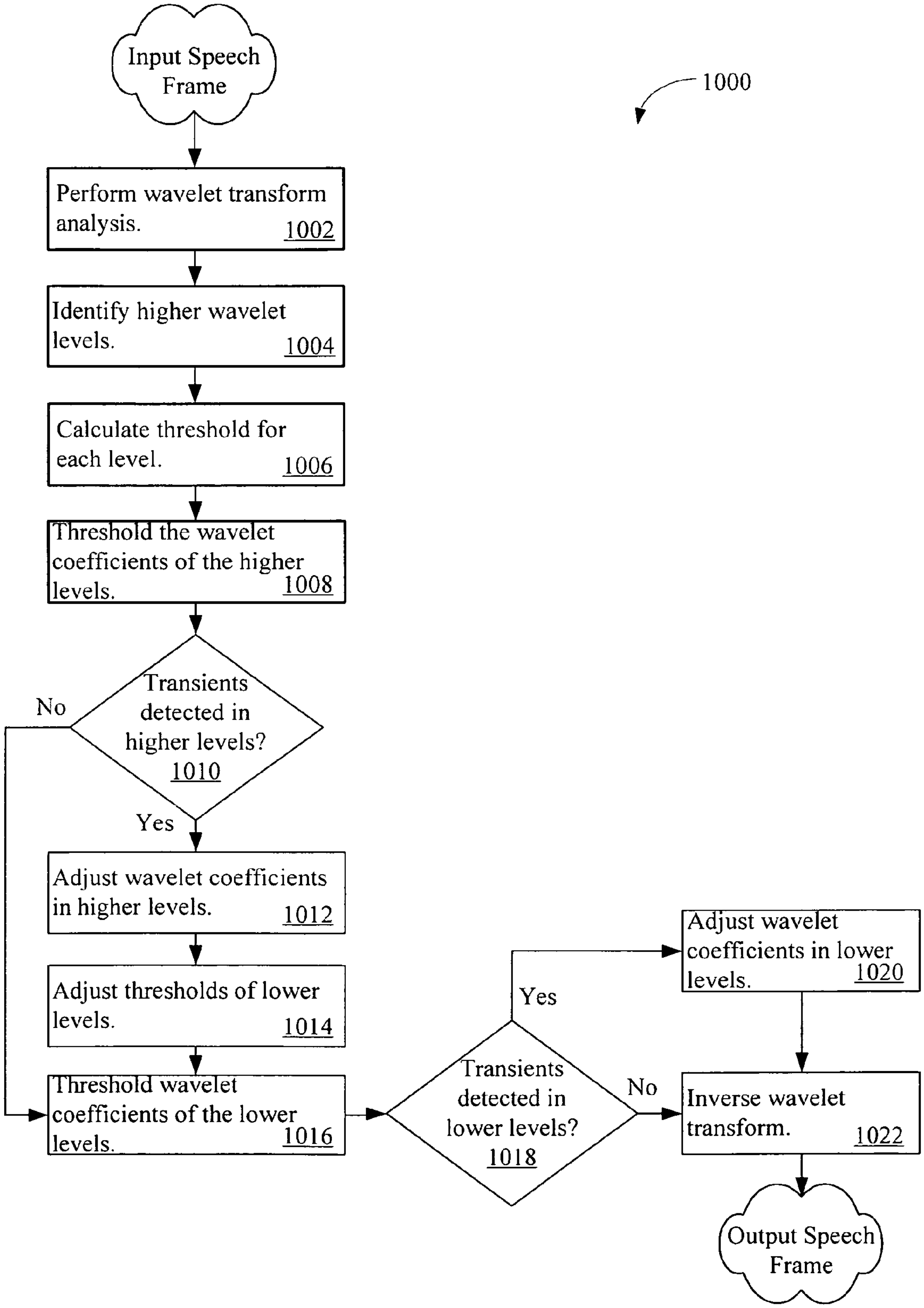
FIG. 10 is process that may remove transient noise from speech using level dependent thresholds.

FIG. 10 is a process 1000 that may remove transient noise from speech using level dependent thresholds. The process 1000 may use the position of transient noise in one or more levels to adjust the threshold applied to wavelet coefficients in other wavelet levels.

The process 1000 receives an input speech frame and applies a wavelet transform analysis on the input speech frame (Act 1002). The decomposed input speech frame may be represented by wavelet coefficients across wavelet levels.

The process 1000 identifies one or more wavelet levels as higher wavelet levels (Act 1004). The process 1000 may use information related to the higher wavelet levels to adjust the threshold applied at the lower levels. The process 1000 may identify one or more of the top levels as the higher wavelet levels. The levels identified as the higher wavelet levels may be tailored to the type of transient to be removed, substantially removed, or dampened.

When a rain transient falls in the middle of a segment of speech for example, the rain transient may be an impulse that occurs across a large portion of the frequency spectrum. Speech may be more likely found at the lower frequencies. In this situation the large coefficients in the lower wavelet levels (which correspond to lower frequency bands) may correspond to both speech and transient noise. However, as speech may be less likely to be found in the higher frequencies, the process 1000 may identify the large coefficients in the higher wavelet levels as transient noise with a higher degree of confidence.

The process 1000 calculates the thresholds for the higher wavelet levels (Act 1006). The process 1000 compares the threshold of each higher wavelet level to the corresponding wavelet coefficients to determine if any of the wavelet coefficients correspond to transient noise (Act 1008). The process 1000 determines if wavelet coefficients corresponding to transient noise were detected in one or more of the higher wavelet levels (Act 1010). If the process 1000 detects transient noise within one or more of the higher wavelet levels, the process 1000 adjusts the wavelet coefficients that correspond to transient noise (Act 1012).

The process 1000 may also determine the position of the transient noise within the higher wavelet levels. Each wavelet level provides some time resolution. When the process 1000 identifies a wavelet coefficient that corresponds to transient noise, the process 1000 may also identify the position of the transient noise.

FIG. 3 shows wavelet coefficients across eight wavelet levels, where level 7 corresponds to the highest level and level 0 corresponds to the lowest level. Where the process 1000 is programmed to remove rain transients, the process 1000 may be less confident that the larger coefficients of levels 3 or 4 correspond to rain transients as opposed to speech. The process 1000 may be more confident that the large coefficients of level 7 correspond to rain transients. In FIG. 3, the wavelet coefficients that correspond to the rain transient occur at substantially similar positions from one wavelet level to another. Once the position of the rain transient is identified at the higher level, the process 1000 may be more confident that large wavelet coefficients occurring at similar positions in the lower wavelet levels also correspond to the rain transient.

When the process 1000 identifies transient noise in the higher levels, the process 1000 may adjust the thresholds of the lower wavelet (Act 1014). The process 1000 may adjust the threshold by reducing the empirically selected wavelet constant used to calculate the threshold. Alternatively, the process 1000 may use a new wavelet constant when calculating the threshold. The process 1000 may adjust the threshold of a sliding window in a lower level when the sliding window reaches a position corresponding to the position of transient noise detected in a higher level. When adjusting the threshold of a sliding window, the process 1000 may not adjust the thresholds corresponding to other window positions that do not match the position of transient noise detected in the higher levels.

The process 1000 may compare the thresholds of the lower wavelet levels to the corresponding wavelet coefficients (Act 1016). Thresholds applied in the lower wavelet levels may be adjusted when the process 1000 detects transient noise in the higher levels.

The process 1000 determines if wavelet coefficients corresponding to transient noise were detected in one or more of the lower levels (Act 1018). When a wavelet coefficient is greater than, equal to, or substantially equal to the threshold, the process 1000 may identify that coefficient as corresponding to transient noise. Where the process 1000 uses a sliding window to calculate thresholds, the system may identify a wavelet coefficient as corresponding to transient noise where the coefficient is greater than, equal to, or substantially equal to the threshold corresponding to that window.

The process 1000 may minimize wavelet coefficients identified in the lower levels that may correspond to transient noise (Act 1020). When the process 1000 minimizes the selected wavelet coefficients that may correspond to transient noise, or when the process 1000 does not identify transient noise at lower levels, the process 1000 may reconstruct the input speech frame (Act 1022). An inverse wavelet transform may be used to reconstruct the input speech frame. The reconstructed frame may include the speech components of the original frame with the transient noise components substantially reduced.

Figure 11:
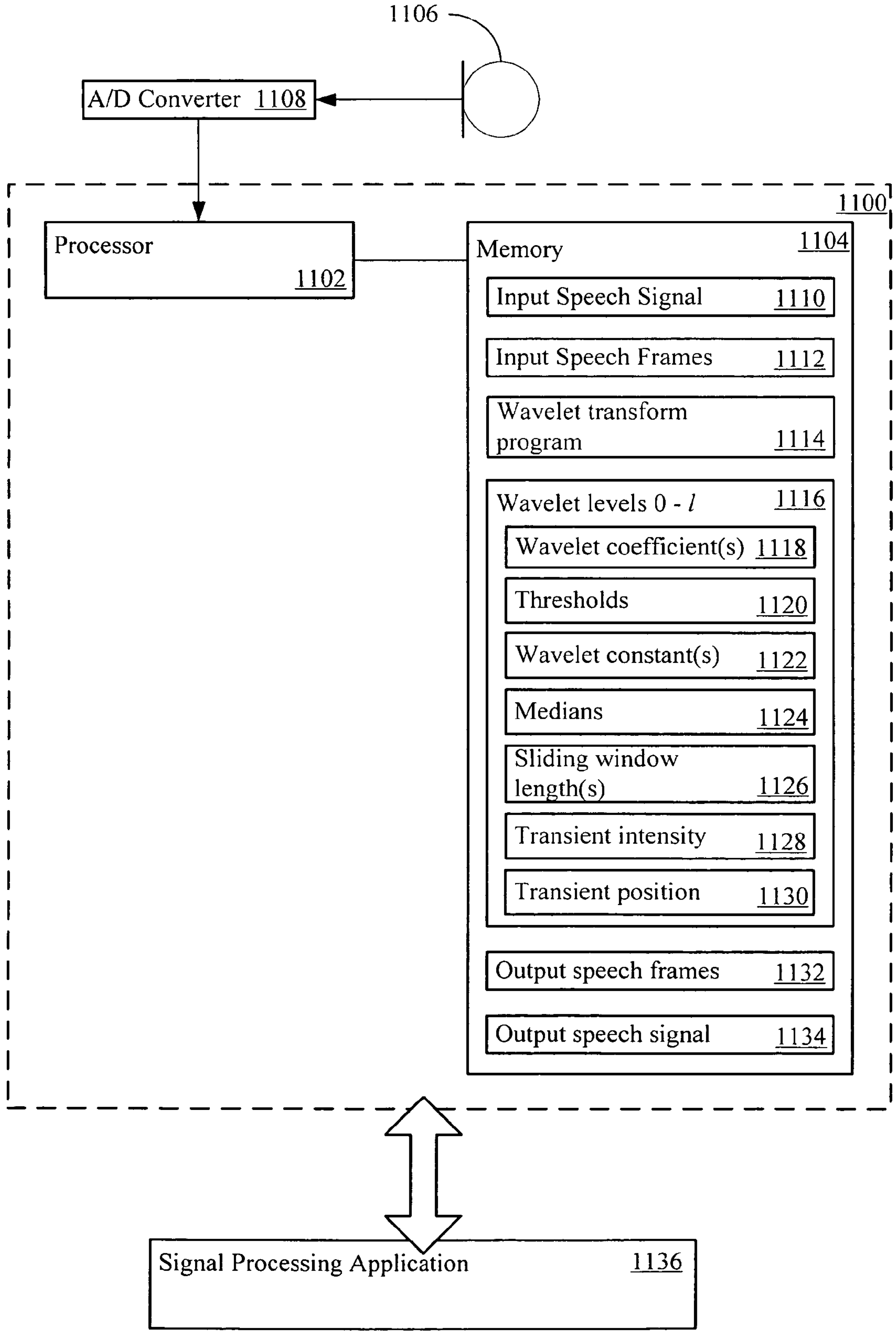
FIG. 11 is a transient noise removal system.

FIG. 11 is a transient noise removal system 1100 that has a processor 1102 and a memory 1104. A speech detection device 1106, such as a microphone, may convert sound waves into a signal. An analog-to-digital converter (A-to-D converter) 1108 may process the signal. The A-to-D converter may convert the signal to a digital format. The processor 1102 may receive the digital signal as an input speech signal 1110 from the A-to-D converter 1108. The A-to-D converter 1108 may be a unitary part of or may be separate from the processor 1102. The processor 1102 may execute instructions stored in the memory 1104 to control operation of the transient noise removal system 1100.

Although selected aspects, features, or components of the implementations are depicted as being stored the memory 1104, all or part of the systems, including the methods and/or instructions for performing such methods consistent with the transient noise removal system 1100, may be stored on, distributed across, or read from other computer-readable media, for example, secondary storage devices such as hard disks, floppy disks, and CD-ROMs; a signal received from a network; or other forms of ROM or RAM either currently known or later developed.

Specific components of the transient noise removal system 1100 may include additional or different components. The processor 1102 may be implemented as a microprocessor, microcontroller, application specific integrated circuit (ASIC), discrete logic, or a combination of other types of circuits or logic. Similarly, the memory 1104 may be DRAM, SRAM, Flash, or any other type of memory. Parameters (e.g., data associated with wavelet levels), databases, and other data structures may be separately stored and managed, may be incorporated into a single memory or database, or may be logically and physically organized in many different ways. Programs, processes, and instruction sets may be parts of a single program, separate programs, or distributed across several memories and processors.

The memory 1104 may store the input speech signal 1110. The transient noise removal system 1100 may segment the input speech signal 1110 into the input speech frames 1112 and store the input speech frames 1112 in the memory 1104. The input speech frames 1112 may overlap. In some systems, the input speech frames 1112 may overlap by about 50%. The transient noise removal system 1100 may consider the sample rate associated with the input speech signal 1110 when determining a length of the input speech frames 1112.

The processor 1102 may execute a wavelet transform program 1114 stored in the memory 1104. The transient noise removal system 1100 may use the wavelet transform program 1114 to decompose an input speech frame 1112 into one or more wavelet levels 1116 including one or more wavelet coefficients 1118.

The memory 1104 may store data corresponding to wavelet levels 0 through l 1116. The data corresponding to the wavelet levels 1116 may include the wavelet coefficients 1118 for each level 1116. The number of wavelet coefficients 1118 for each level may equal $2^l$, where l equals the level number. For example, level 3 may include $2^3=8$ wavelet coefficients, while level 7 may include $2^7=128$ wavelet coefficients.

The processor 1102 may execute instructions stored on the memory 1104 to calculate a threshold 1120 for each level 1116. The threshold 1120 for level l 1116 may be calculated as the product of a wavelet constant 1122 for level l and a median 1124 of the absolute value of the wavelet coefficients 1118 of level l. The memory 1104 may store the thresholds 1120 calculated by the transient removal system 1100. The memory 1104 may also store the wavelet constants 1122 and medians 1124 used to calculate the thresholds 1120.

The threshold 1120 for a sliding window of length $n_l$ 1126 may be calculated as the product of the wavelet constant 1122 and the median 1124 of the absolute value of the wavelet coefficients 1118 within the sliding window. The processor 1102 may use windows of equal lengths 1126 for each level 1116. The processor 1102 may also use different window lengths 1126 for different levels 1116. For example, the window length 1126 used by the processor 1102 may progressively increase from the higher to the lower levels 1116. The memory 1104 may also store the lengths 1126 of one or more sliding windows.

The processor 1102 may use different wavelet constants 1122 for calculating the thresholds 1120. The processor 1102 may consider various criteria in selecting which wavelet constant 1122 to use. In some systems, the processor 1102 may use a different wavelet constant 1122 for different levels 1116. The processor 1102 may also use different wavelet constants 1122 as the sliding window moves from one position to another within a level.

The processor 1102 may also consider other criteria such as the speech characteristics of the input speech signal 1110 or the intensity 1128 of transient noise within the signal. The processor 1102 may monitor the wavelet coefficients 1118 to detect the intensity 1128 of transient noise in speech. A transient noise removal system 1100 programmed to remove rain transients from speech may use a different wavelet constant 1122 for different intensities 1128 of rain. In a rain transient removal system, the processor 1102 may estimate the intensity 1128 of rain transients by tracking the number of wavelet coefficients 1118 that exceed the threshold 1120 in the higher levels. Based on the transient noise intensity 1128 detected in the higher levels, the processor 1102 may adjust the wavelet constants 1122, sliding window lengths 1126, or other data corresponding to lower wavelet levels 1116.

The processor 1102 may execute instructions stored in the memory 1104 to compare the threshold 1120 of each level 1116 to the wavelet coefficients 1118 of that level 1116. The processor 1102 may also execute instructions stored on the memory 1104 to compare the threshold 1120 of a sliding window to the wavelet coefficients 1118 of that window.

When a wavelet coefficient 1118 is greater than, equal to, or substantially equal to the coefficient's 1118 corresponding threshold, the processor 1102 may identify the wavelet coefficient as corresponding to transient noise. The processor 1102 may execute instructions stored on the memory 1104 to adjust the wavelet coefficient 1118 to minimize the transient noise. The processor 1102 may adjust the wavelet coefficients 1118 to minimize transient noise by attenuating the wavelet coefficient 1118. In some systems, the processor 1102 may attenuate the wavelet coefficient 1118 to zero or nearly zero. Alternatively, the processor 1102 may attenuate the wavelet coefficient 1118 to equal the threshold 1120. The processor 1102 may also attenuate the wavelet coefficient 1118 to equal other values.

The processor 1102 may also determine a position 1130 of the identified transient noise within the wavelet level 1116. The processor 1102 may use the position 1130 of identified transient noise in one wavelet level 1116 to adjust the thresholds 1120 corresponding to other wavelet levels 1116. The memory 1104 may store the positions 1130 of the identified transient noise.

The processor 1102 may execute instructions stored on the memory 1104 to perform an inverse wavelet transform to reconstruct the input speech frames 1112 as output speech frames 1132. The output speech frames 1132 represents the input speech frames 1112 with transient noise components attenuated or removed from the original signal. The processor 1102 may execute instructions stored on the memory to combine the output speech frames 1132 into the output speech signal 1134. As a precursor to combining the output speech frames 1132, the processor 1102 may apply a Hamming window, Hann window, or other window function to the output speech frames 1132 in order to suppress any discontinuities at the edges of each frame.

The processor may communicate the output speech signal 1134 to a signal processing application 1136, such as a voice recognition system. The transient noise removal system 1100 reduces transient noise originally present in the input speech signal 1110. Although transient noise may be significantly reduced, the output speech signal 1134 substantially retains the desired speech signal. Improved speech signal clarity and intelligibility result. The low transient noise output signal enhances performance in a wide range of applications, including speech detection, transmission, and recognition.

The transient noise removal system 1100 may be customized for a speech signal processing system, such as a voice recognition system. The transient noise removal system 1100 may also be designed or tailored to remove transient noise in other applications related to image, video, audio, or other signal processing systems.

The disclosed methods, processes, programs, and/or instructions may be encoded in a signal bearing medium, a computer readable medium such as a memory, programmed within a device such as on one or more integrated circuits, or processed by a controller or a computer. If the methods are performed by software, the software may reside in a memory resident to or interfaced to a communication interface, or any other type of non-volatile or volatile memory. The memory may include an ordered listing of executable instructions for implementing logical functions. A logical function may be implemented through digital circuitry, through source code, through analog circuitry, or through an analog source such through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The computer-readable medium may selectively be, but not limited to, an electronic, magnetic, optical, electromagnetic, infrared, or semiconductor system, apparatus, device, or propagation medium. A non-exhaustive list of examples of a computer-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A computer-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for removing a transient from speech comprising:

receiving an input speech frame at an input of a speech processor;

the speech processor performing a wavelet transform on the input speech frame to represent the input speech frame by multiple wavelet coefficients within a wavelet level, where the multiple wavelet coefficients within the wavelet level comprise a first wavelet coefficient;

the speech processor determining a first threshold;

the speech processor comparing the first wavelet coefficient to the first threshold; and the speech processor setting the first wavelet coefficient to approximately equal the first threshold when the first wavelet coefficient is greater than or substantially equal to the first threshold.

2. The method of claim 1, where determining a first threshold comprises:

establishing a first wavelet constant;

determining a first median, where the first median comprises a median of the wavelet coefficients within the wavelet level; and establishing the first threshold as a product of the first wavelet constant and the first median.

3. The method of claim 1, further comprising:

the speech processor establishing a wavelet window at a first position within the wavelet level, where the wavelet window comprises a window length, and where the first wavelet coefficient is located within the wavelet window at the first position;

the speech processor establishing a first wavelet constant;

the speech processor determining a first window median, where the first window median comprises the median of wavelet coefficients within the first window established at the first position; and the speech processor establishing the first threshold as a product of the first wavelet constant and the first window median.

4. The method of claim 3, further comprising:

the speech processor determining a second threshold comprising:

moving the wavelet window to a second position within the wavelet level;

establishing a second wavelet constant;

determining a second window median, where the second window median comprises the median of wavelet coefficients within the wavelet window at the second position; and establishing the second threshold as a product of the second wavelet constant and the second window median.

5. The method of claim 4, further comprising:

the speech processor comparing the second threshold to the wavelet coefficient within the wavelet window at the second position; and the speech processor adjusting the wavelet coefficients within the wavelet window at the second position that are greater than or substantially equal to the second threshold.

6. The method of claim 1, where the input speech frame is further represented by multiple wavelet coefficients within a second wavelet level, and where the multiple wavelet coefficients within the second wavelet level comprise a second wavelet coefficient.

7. The method of claim 6, further comprising:

the speech processor determining a third threshold;

the speech processor comparing the second wavelet coefficient to the second threshold; and the speech processor adjusting the second wavelet coefficient when the third wavelet coefficient is greater than or substantially equal to the second threshold.

8. The method of claim 7, further comprising the speech processor adjusting the first threshold when the second wavelet coefficient is greater than or substantially equal to the second threshold.

9. The method of claim 1, where performing the wavelet transform on the input speech frame comprises tailoring a wavelet to a type of transient to be substantially removed.

10. A system for removing a transient from speech comprising:

a processor;

a the memory retaining instructions that cause the processor to:

receive an input speech frame;

perform a wavelet transform on the input speech frame to represent the input speech frame through multiple wavelet coefficients within a wavelet level, where the multiple wavelet coefficients within the wavelet level comprise a first wavelet coefficient;

determine a first threshold for the wavelet level;

compare the first wavelet coefficient to the first threshold; and set the first wavelet coefficient to approximately equal the first threshold when the first wavelet coefficient is greater than or substantially equal to the first threshold.

11. The system of claim 10, where the instructions that cause the processor to determine a first threshold cause the processor to:

establish a first wavelet constant;

determine a first median, where the first median comprises a median of wavelet coefficients within the wavelet level; and establish the first threshold as a product of the first wavelet coefficient and the first median.

12. The system of claim 11, where the instructions that cause the processor to establish a first wavelet constant cause the processor to:

determine a transient intensity; and select the first wavelet constant from among a set of wavelet constants based on the determined transient intensity.

13. The system of claim 10, further comprising instructions that cause the processor to:

establish a wavelet window at a first position within the wavelet level;

establish a first wavelet constant;

determine a first window median, where the first window median comprises the median of wavelet coefficients within the wavelet window; and establish the first threshold as a product of the first wavelet constant and the first window median.

14. The system of claim 13, further comprising instructions that cause the processor to:

move the wavelet window to a second position within the wavelet level;

establish a second wavelet constant;

determine a second window median, where the second window median comprises the median of wavelet coefficients within the wavelet window at the second position; and establish a second threshold as a product of the second wavelet constant and the second window median.

15. The system of claim 10, where the instructions that cause the processor to perform a wavelet transform on the input speech frame cause the processor to tailor a wavelet to a type of transient to be substantially dampened.

16. The system of claim 10, where the instructions that cause the processor to receive the input speech frame cause the processor to:

receive an input speech signal; and segment the input speech signal into frames.

17. The system of claim 10, where the wavelet transform further represents the input speech frame through multiple wavelet coefficients within a second wavelet level, and where the multiple wavelet coefficients within the second wavelet level comprise a second wavelet coefficient.

18. The system of claim 17, further comprising instructions that cause the processor to:

determine a third threshold;

compare the second wavelet coefficient to the third threshold; and adjust the first threshold where the second wavelet coefficient is greater than or substantially equal to the third threshold.

19. A product comprising:

a non-transitory computer readable medium; and programmable instructions stored on the computer readable medium that cause a processor in an transient noise removal system to:

receive an input speech frame;

perform a wavelet transform on the input speech frame to represent the input speech frame by a first wavelet coefficient and a second wavelet coefficient within a first wavelet level and a third wavelet coefficient and a fourth wavelet coefficient within a second wavelet level;

determine a first threshold, where the first threshold is a product of a first wavelet constant and the median of the first wavelet coefficient and the second wavelet coefficient, and where the first wavelet constant is selected from a set of wavelet constants;

determine a second threshold, where the second threshold is a product of a second wavelet constant and the median of the third wavelet coefficient and the fourth wavelet coefficient;

compare the first wavelet coefficient to the first threshold; and adjust the first wavelet coefficient when the first wavelet coefficient is greater than or substantially equal to the first threshold.

20. The product of claim 19, where the programmable instructions stored on the computer readable medium cause the processor to adjust the second threshold when the first wavelet coefficient is greater than or substantially equal to the first threshold.

21. The product of claim 20, where the programmable instructions stored on the computer readable medium cause the processor to:

compare the third wavelet coefficient to the second threshold; and adjust the third wavelet coefficient where the third wavelet coefficient is greater than or substantially equal to the second threshold.

22. The product of claim 20, where the programmable instructions stored on the computer readable medium that cause the processor to adjust the second threshold cause the processor to:

determine the position of the first wavelet coefficient within the first wavelet level; and adjust the second threshold in consideration of the position of the first wavelet coefficient within the first wavelet level.

23. The product of claim 19, where the programmable instructions stored on the computer readable medium that cause the processor to determine a first threshold cause the processor to:

establish a wavelet window at a first position within the first wavelet level, where the first and the second wavelet coefficients are located within the wavelet window at the first position;

establish the first threshold as the product of the first wavelet constant and the median of the first and the second wavelet coefficients; and establish the wavelet window at a second position within the first wavelet level.

24. The product of claim 19, where the programmable instructions stored on the computer readable medium that cause the processor to adjust the first wavelet coefficient cause the processor to set the first wavelet coefficient to approximately zero.

25. The product of claim 19, where the programmable instructions stored on the computer readable medium that cause the processor to adjust the first wavelet coefficient cause the processor to set the first wavelet coefficient to approximately equal the first threshold.

26. A method for removing a transient from speech comprising:

receiving an input speech frame at an input of a speech processor;

the speech processor performing a wavelet transform on the input speech frame to represent the input speech frame by multiple wavelet coefficients within a wavelet level, where the multiple wavelet coefficients within the wavelet level comprise a first wavelet coefficient;

the speech processor determining a first threshold;

the speech processor determining a second threshold comprising:

moving the wavelet window to a second position within the wavelet level;

establishing a second wavelet constant;

determining a second window median, where the second window median comprises the median of wavelet coefficients within the wavelet window at the second position; and establishing the second threshold as a product of the second wavelet constant and the second window median;

the speech processor comparing the first wavelet coefficient to the first threshold; and the speech processor adjusting the first wavelet coefficient when the first wavelet coefficient is greater than or substantially equal to the first threshold.

27. The method of claim 26, further comprising:

the speech processor comparing the second threshold to the wavelet coefficient within the wavelet window at the second position; and the speech processor adjusting the wavelet coefficients within the wavelet window at the second position that are greater than or substantially equal to the second threshold.

28. A method for removing a transient from speech comprising:

receiving an input speech frame at an input of a speech processor;

the speech processor performing a wavelet transform on the input speech frame to represent the input speech frame by multiple wavelet coefficients within a first wavelet level and by multiple wavelet coefficients within a second wavelet level, where the multiple wavelet coefficients within the wavelet level comprise a first wavelet coefficient and the multiple wavelet coefficients within the second wavelet level comprise a second wavelet coefficient;

the speech processor determining a first threshold;

the speech processor determining a second threshold;

the speech processor comparing the second wavelet coefficient to the second threshold;

the speech processor adjusting the second wavelet coefficient when the third wavelet coefficient is greater than or substantially equal to the second threshold;

the speech processor adjusting the first threshold when the second wavelet coefficient is greater than or substantially equal to the second threshold;

the speech processor comparing the first wavelet coefficient to the first threshold; and the speech processor adjusting the first wavelet coefficient when the first wavelet coefficient is greater than or substantially equal to the first threshold.

29. A system for removing a transient from speech comprising:

a processor;

a the memory retaining instructions that cause the processor to:

receive an input speech frame;

perform a wavelet transform on the input speech frame to represent the input speech frame through multiple wavelet coefficients within a wavelet level, where the multiple wavelet coefficients within the wavelet level comprise a first wavelet coefficient;

determine a first threshold for the wavelet level, comprising:

establishing a first wavelet constant, comprising:

determining a transient intensity; and selecting the first wavelet constant from among a set of wavelet constants based on the determined transient intensity;

determining a first median, where the first median comprises a median of wavelet coefficients within the wavelet level; and establishing the first threshold as a product of the first wavelet coefficient and the first median;

compare the first wavelet coefficient to the first threshold; and adjust the first wavelet coefficient where the first wavelet coefficient is greater than or substantially equal to the first threshold.

30. A system for removing a transient from speech comprising:

a processor;

a the memory retaining instructions that cause the processor to:

receive an input speech frame;

perform a wavelet transform on the input speech frame to represent the input speech frame through multiple wavelet coefficients within a wavelet level, where the multiple wavelet coefficients within the wavelet level comprise a first wavelet coefficient;

establish a wavelet window at a first position within the wavelet level;

establish a first wavelet constant;

determine a first window median, where the first window median comprises the median of wavelet coefficients within the wavelet window;

determine a first threshold as a product of the first wavelet constant and the first window median;

compare the first wavelet coefficient to the first threshold;

adjust the first wavelet coefficient where the first wavelet coefficient is greater than or substantially equal to the first threshold;

move the wavelet window to a second position within the wavelet level;

establish a second wavelet constant;

determine a second window median, where the second window median comprises the median of wavelet coefficients within the wavelet window at the second position; and establish a second threshold as a product of the second wavelet constant and the second window median.

31. A product comprising:

a non-transitory computer readable medium; and programmable instructions stored on the computer readable medium that cause a processor in an transient noise removal system to:

receive an input speech frame;

perform a wavelet transform on the input speech frame to represent the input speech frame by a first wavelet coefficient and a second wavelet coefficient within a first wavelet level and a third wavelet coefficient and a fourth wavelet coefficient within a second wavelet level;

determine a first threshold, where the first threshold is a product of a first wavelet constant and the median of the first wavelet coefficient and the second wavelet coefficient;

determine a second threshold, where the second threshold is a product of a second wavelet constant and the median of the third wavelet coefficient and the fourth wavelet coefficient;

compare the first wavelet coefficient to the first threshold;

adjust the first wavelet coefficient when the first wavelet coefficient is greater than or substantially equal to the first threshold; and adjust the second threshold when the first wavelet coefficient is greater than or substantially equal to the first threshold.

32. The product of claim 31, where the programmable instructions stored on the computer readable medium that cause the processor to adjust the second threshold cause the processor to:

determine the position of the first wavelet coefficient within the first wavelet level; and adjust the second threshold in consideration of the position of the first wavelet coefficient within the first wavelet level.

33. A product comprising:

a non-transitory computer readable medium; and programmable instructions stored on the computer readable medium that cause a processor in an transient noise removal system to:

receive an input speech frame;

perform a wavelet transform on the input speech frame to represent the input speech frame by a first wavelet coefficient and a second wavelet coefficient within a first wavelet level and a third wavelet coefficient and a fourth wavelet coefficient within a second wavelet level;

determine a first threshold, comprising:

establishing a wavelet window at a first position within the first wavelet level, where the first and the second wavelet coefficients are located within the wavelet window at the first position;

establishing the first threshold as the product of the first wavelet constant and the median of the first and the second wavelet coefficients; and establishing the wavelet window at a second position within the first wavelet level;

determine a second threshold, where the second threshold is a product of a second wavelet constant and the median of the third wavelet coefficient and the fourth wavelet coefficient;

compare the first wavelet coefficient to the first threshold; and adjust the first wavelet coefficient when the first wavelet coefficient is greater than or substantially equal to the first threshold.

34. A product comprising:

a non-transitory computer readable medium; and programmable instructions stored on the computer readable medium that cause a processor in an transient noise removal system to:

receive an input speech frame;

perform a wavelet transform on the input speech frame to represent the input speech frame by a first wavelet coefficient and a second wavelet coefficient within a first wavelet level and a third wavelet coefficient and a fourth wavelet coefficient within a second wavelet level;

determine a first threshold, where the first threshold is a product of a first wavelet constant and the median of the first wavelet coefficient and the second wavelet coefficient;

determine a second threshold, where the second threshold is a product of a second wavelet constant and the median of the third wavelet coefficient and the fourth wavelet coefficient;

compare the first wavelet coefficient to the first threshold; and set the first wavelet coefficient to approximately equal the first threshold when the first wavelet coefficient is greater than or substantially equal to the first threshold.

* * * * *